(12) United States Patent
Schmidt et al.

(10) Patent No.: US 6,699,930 B1
(45) Date of Patent: Mar. 2, 2004

(54) AQUEOUS 1-COMPONENT SILICONE COMPOSITION

(75) Inventors: Manfred Schmidt, Bodenheim (DE); Antje Lässig, Dresden (DE); Bernward Deubzer, Burchausen (DE); Frank Baumann, Mehring (DE)

(73) Assignee: Wacker-Chemie GmbH, Munich (DE)

( * ) Notice: Subject to any disclaimer, the term of this patent is extended or adjusted under 35 U.S.C. 154(b) by 209 days.

(21) Appl. No.: 09/619,048

(22) Filed: Jul. 18, 2000

(30) Foreign Application Priority Data

Jul. 22, 1999 (DE) .......................... 199 34 438

(51) Int. Cl.[7] .......................... C08L 83/00; C08G 77/06
(52) U.S. Cl. ....................... 524/588; 525/477; 523/201; 516/59; 516/76; 524/837
(58) Field of Search ................. 524/588, 837; 525/100, 477; 523/201; 106/287.14; 516/59, 76

(56) References Cited

U.S. PATENT DOCUMENTS

| | | | | |
|---|---|---|---|---|
| 4,816,506 A | * | 3/1989 | Gamon et al. | 524/588 |
| 4,918,131 A | * | 4/1990 | Gamon et al. | 524/588 |
| 5,049,636 A | * | 9/1991 | Wolfgruber et al. | 528/33 |
| 5,070,175 A | * | 12/1991 | Tsumura et al. | 528/12 |
| 5,674,937 A | * | 10/1997 | Berg et al. | 524/831 |
| 5,840,800 A | * | 11/1998 | Joffre et al. | 525/100 |
| 5,854,369 A | * | 12/1998 | Geck et al. | 528/33 |
| 5,973,061 A | * | 10/1999 | Feder et al. | 524/588 |
| 6,147,142 A | * | 11/2000 | Geck et al. | 525/100 |
| 6,287,701 B1 | * | 9/2001 | Oochi et al. | 524/588 |

FOREIGN PATENT DOCUMENTS

| | | |
|---|---|---|
| EP | 0 335 414 A2 | 10/1989 |
| EP | 0 359 676 A1 * | 3/1990 |

OTHER PUBLICATIONS

Derwent Abstract Corresponding To EPO 335 414 (AN 1989–286905), Week 198940.

* cited by examiner

Primary Examiner—Daniel S. Metzmaier
(74) Attorney, Agent, or Firm—Brooks Kushman P.C.

(57) ABSTRACT

An aqueous 1-component composition which forms a resilient silicone network on drying and is obtained by reaction, at a temperature of at least 40° C., of I) a surfactant-stabilized dispersion of a highly crosslinked silicone compound which carries reactive groups which are selected from silanol, hydrocarbon-oxy and silanolate groups with II) a surfactant-stabilized emulsion of optionally pre-crosslinked silicone oil which carries reactive groups which are selected from silanol, hydrocarbon-oxy and silanolate groups.

11 Claims, No Drawings

AQUEOUS 1-COMPONENT SILICONE COMPOSITION

TECHNICAL FIELD

The invention pertains to an aqueous 1-component composition which forms a resilient silicone network on drying.

BACKGROUND ART

All water-based silicone coating systems based on crosslinking silicones have required an additional catalyst component which, for example, is added only shortly before actual use, in order to prevent premature gellation. A typical example is the platinum-catalyzed vulcanization of silicones containing vinyl groups with silicones carrying Si—H groups, for example in paper coating or fabric coating. The following aqueous composition is known for coating as an emulsion:

1) An oil-in-water emulsion of siloxane oils carrying vinyl groups which are stabilized with anionic or nonionic surfactants;
2) An oil-in-water emulsion of siloxane oils carrying Si—H groups which are stabilized with anionic or nonionic surfactants;
3) Optionally a filler;
4) A catalyst component (platinum compound); and
5) Optionally an inhibitor.

A further type of crosslinkable emulsion is based on crosslinking silicone oils having α,ω-alkoxy or hydroxyl functions, which is catalyzed with the aid of metal salts, e.g. tin compounds, which optionally may also contain borates. Such systems have the following composition:

1) An oil-in-water emulsion of α,ω-dihydroxypolyorganosiloxane and/or α,ω-dialkoxyorganosiloxane, stabilized with an anionic or nonionic surfactant;
2) A crosslinking agent, such as colloidal silica gel, sodium silicate (=catalyst), siliconates, or microemulsions of silsesquioxanes or silicone resins, polysilicates, polyalkoxysilanes;
3) An inorganic or organic filler; and
4) A catalyst for curing (e.g. salts of the metals tin, lead, calcium, barium, zirconium or iron).

The two water-based coating systems described above also have further disadvantages in addition to the aforementioned catalyst problem:

A) the individual components or at least the catalyst component must be stored separately and can be mixed in only shortly before use, i.e. complicated process engineering during application;
B) the emulsions have only very limited shelf-life, shear stability and thermal stability;
C) in the case of high solids contents, the viscosity increases greatly;
D) the compositions exhibit high shrinkage on drying; and
E) the compositions demonstrate poor adhesion to the substrate.

A further type of system crosslinkable in situ comprises, for example, silicone oils which carry α,ω-dialkoxy-terminated amino groups which readily crosslink on application (e.g. to textiles). The disadvantage of this type of coating is its low crosslinking density and problems associated therewith, such as poor mechanical properties, poor permanence on the substrate, a large amount of extractables, "exudation" of silicone oil, etc.

DISCLOSURE OF INVENTION

An object of the present invention was to provide an aqueous 1-component system which has a long shelf-life and forms a resilient silicone network on drying, without the addition of a catalyst.

BEST MODE FOR CARRYING OUT THE INVENTION

The invention pertains to aqueous 1-component compositions which form resilient silicone networks on drying and are obtained by reaction, at a temperature of at least 40° C., of I) a surfactant-stabilized dispersion of at least one highly crosslinked silicone compound which carries reactive groups, selected from silanol, hydrocarbon-oxy and silanolate groups with
II) a surfactant-stabilized emulsion of at least one optionally precrosslinked silicone oil which carries reactive groups, selected from silanol, hydrocarbon-oxy and silanolate groups.

This composition cures on drying without the addition of a catalyst. The composition is distinguished by its long shelf-life, even at elevated temperature, and its high shear stability. At the same time, low viscosities at high solids content and filler content can be achieved with this composition.

Silicone dispersion (I), which may also be referred to as polyorganosilicic acid sol, preferably contains highly crosslinked silicone compound (Ia) composed of units of the general formulae (Ia-1) to (Ia-4):

| | | |
|---|---|---|
| 30 to 100 mol % of | $R_{(1-a)}(R^1O)_aSiO_{3/2}$ | (Ia-1), |
| 20 to 100 mol % of | $(R^1O)_bSiO_{(4-b)/2}$ | (Ia-2), |
| 0 to 70 mol % of | $R_{(2-c)}(R^1O)_cSiO_{2/2}$ | (Ia-3), |
| 0 to 50 mol of | $R_{(3)}SiO_{1/2}$ | (Ia-4), | in which

R may be identical or different and is a hydrogen atom or an Si—C-bonded $C_1$- to $C_{30}$-hydrocarbon radical which optionally may also be substituted by halogen atoms or may carry one or more functional groups, $R^1$ may be identical or different and may be a hydrogen atom, an alkali metal or alkaline earth metal atom, or a monovalent $C_1$- to $C_{16}$-hydrocarbon radical which optionally may also carry halogen atoms, the hydrocarbon chain of which may be interrupted by hetero atoms such as oxygen, a is 0 or 1, b is 0, 1, 2 or 3 and c is 0 or 1.

Examples of functional groups which may be present in R are double bonds such as the vinyl group, the acrylate group, etc.; or amino groups such as the aminopropyl or aminopropylaminoethyl group or a cyclohexylamine group; a mercapto group such as the mercaptopropyl group; epoxy groups; acid anhydride groups; acid groups; etc. Preferred radicals R in each case are the $C_1$- to $C_6$-alkyl radicals and the phenyl radical, in particular the unsubstituted radicals of these types, and the methyl radical.

Silicone compound (Ia) preferably contains, in each case independently of one another, 60 to 100 mol % of units of the general formula Ia-1,
60 to 100 mol % of units of the general formula Ia-2, 0 to 40 mol % of units of the general formula Ia-3,
0 to 20 mol % of units of the general formula Ia-4.

Silicone dispersion (I) may contain silanes of the general formula (Ib)

in which

R and $R^1$ have the above meaning and d may be 1, 2, 3 or four.

100 parts of silicone dispersion (I) preferably contain 1 to 50 parts, in particular 5 to 30 parts, of silicone compound (Ia) and 0.5 to 20 parts, in particular 1 to 10 parts, of surfactant and may also contain 0 to 30 parts, in particular 5 to 20 parts, of an alcohol and 0 to 5 parts, in particular 0 to 2 parts, of the silane of the general formula (Ib). The remaining amount to 100 parts in each case comprises water. "Parts" as used herein means parts on a mass basis.

Silicone oil emulsion (II) contains silicone oils of the general formula II

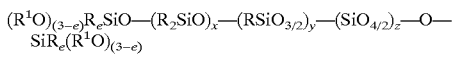

in which

R and $R^1$ have the above meanings and e is 0, 1 or 2, x is 2 to 1,000,000, y is 0 to 100,000, in particular 0 to 100, and z is 0 to 100,000, in particular 0 to 100, and y+z: x is not more than 1:10, in particular not more than 1:40.

100 parts of the silicone oil emulsion (II) preferably contain 1 to 60 parts, in particular 20 to 40 parts, of silicone oils (IIa) and 0.5 to 40 parts, in particular 5 to 15 parts, of surfactant, and may also contain 0 to 20 parts, in particular 0 to 10 parts, of an alcohol and 0 to 5 parts, in particular 0 to 2 parts, of the silane of the general formula (Ib). The remaining amount to 100 parts in each case, comprises water. Silicone oil emulsion (II) is preferably of the oil-in-water type.

The pH of the silicone dispersion (I) and of the silicone oil emulsion (II) may vary in each case from 0 to 14.

In addition, the composition may also contain 0 to 100 parts of acidic, neutral, basic, inorganic or organic additives, such as fillers, water-soluble or water-dispersible oligomers or polymers. The additives may originate from the silicone dispersion (I) and/or from the silicone oil emulsion (II) or may be added to the composition. The solids content of the composition may vary preferably from 5% by weight to 90% by weight, with 20 to 70% by weight solids being particularly preferred, in particular 25 to 40% by weight solids.

Preferred examples of inorganic fillers are precipitated silica, pyrogenic silica, titanium dioxide, basic or acidic aluminas, etc. Organic fillers are, for example, aqueous latices, such as SBR latex, etc.

Preferred examples of water-soluble or water-dispersible oligomers or polymers are nonionic compounds, such as polyethylene glycols and polyethylenepolypropylene copolymers in a molar mass range from 200 g/mol to 20,000 g/mol, or polyelectrolytes, such as polyacrylic acids, etc.

Preferred examples of alcohols used are primary $C_1$- to $C_6$-alcohols, such as methanol, ethanol, butanol, or secondary $C_3$- to $C_8$-alcohols, such as isopropanol, 2-butanol, etc., or tertiary $C_4$- to $C_8$-alcohols, such as tert-butanol, etc.

The surfactants used may be ionic or nonionic. Mixtures of surfactants may also be used. Particularly suitable surfactants are:

Alkylsulfates, for example having a chain length of 8–18 C atoms, aryl and alkyl ether sulfates having 8–18 C atoms in the hydrophobic radical and 1–40 ethylene oxide (EO) or propylene oxide (PO) units;

sulfonates, e.g. alkanesulfonates having 8–18 C atoms, alkylarylsulfonates having 8–18 C atoms, esters and monoesters of sulfosuccinic acid with monohydric alcohols or alkylphenols having 4–15 C atoms; these alcohols or alkylphenols may optionally also be ethoxylated with 1–40 EO units;

alkali metal and ammonium salts of carboxylic acids having 8–20 C atoms in the alkyl, aryl, alkaryl or arylalkyl radical;

partial esters of phosphoric acid and their alkali metal and ammonium salts, e.g. alkyl and alkaryl phosphates having 8–20 C atoms in the organic radical, alkyl ether or alkaryl ether phosphates having 8–20 C atoms in the alkyl or alkaryl radical and 1–40 EO units;

alkyl polyglycol ethers having 2–40 EO units and alkyl radicals of 4–20 C atoms;

alkylaryl polyglycol ethers having 2–40 EO units and 8–20 C atoms in the alkyl and aryl radicals;

ethylene oxide/propylene oxide (EO/PO) block copolymers having 8–40 EO and PO units;

fatty acid polyglycol esters having 6–24 C atoms and 2–40 EO units;

alkylpolyglycosides, natural substances and their derivatives, such as lecithin, lanolin, saponins, cellulose; cellulose alkyl ethers and carboxyalkyl-celluloses whose alkyl groups each have up to 4 carbon atoms;

linear organo(poly)siloxanes containing polar groups and having alkoxy groups having up to 24 C atoms and/or up to 40 EO and/or PO groups;

salts of primary, secondary and tertiary fatty amines having 8–24 C atoms with acetic acid, sulfuric acid, hydrochloric acid and phosphoric acids;

quaternary ammonium salts, such as halides, sulfates, phosphates, acetates or hydroxides, whose alkyl groups, independently of one another, have 1–24 C atoms; optionally, some of the alkyl or alkaryl or aralkyl groups of the quaternary ammonium compounds may also be ethoxylated (1–40 EO units); and alkylpyridinium, alkylimidazolinium and alkyloxazolinium salts whose alkyl chain has up to 18 C atoms, in the form of their halides, sulfates, phosphates or acetates.

Aliphatically substituted benzenesulfonic acids and their salts and optionally partially ethoxylated quaternary ammonium halides and hydroxides are preferred. Dodecylbenzenesulfonic acid and benzyldimethyl{2-[2-(p-1,1,3,3-tetramethylbutylphenoxy)ethoxy]ethyl}ammonium chloride (benzethonium chloride) are particularly preferred.

The formulation according to the invention may be composed of the components (I) and (II) as follows:

0.5 to 90 parts of the silicone dispersion (I) and 99.5 to 10 parts of the silicone oil emulsion (II).

The invention also relates to a process for the preparation of the aqueous 1-component composition which forms a resilient silicone network on drying, in which (I) a surfactant-stabilized dispersion of a highly crosslinked silicone compound which carries reactive groups which are selected from silanol, hydrocarbon-oxy and silanolate groups is reacted, at at least 40° C., with II) a surfactant-stabilized emulsion of optionally pre-crosslinked silicone oil which carries reactive groups which are selected from silanol, hydrocarbon-oxy and silanolate groups.

In the reaction of silicone dispersion (I) with silicone oil emulsion (II) to give the aqueous 1-component composition, preferably 0.5 to 90 parts, in particular 1 to 20 parts, of the silicone dispersion (I) and 99.5 to 10 parts, in particular 99 to 60 parts, of the silicone oil emulsion II are used.

The reaction can be carried out without a catalyst or can be catalyzed by acid or base. The catalysts used for the reaction can remain in the composition or can be removed. For the preparation of the composition, all components of the composition are preferably combined in the ratios described above and reacted optionally with the addition of a homogeneous or heterogeneous catalyst. When heterogeneous catalysts are used, the possible filler addition is not effected until after the reaction.

Suitable catalysts are heterogeneous acidic or basic systems, such as acidic or basic aluminas, etc. The heterogeneous catalysts can be filtered off after the reaction.

Preferred reaction temperatures are 45° C. to 100° C., in particular 45° C. to 80° C. and most preferably 50 to 70° C.

The solids content of the composition may be adjusted by removing water or alcohol. A suitable method for this purpose is, for example, distillation at atmospheric pressure or reduced pressure.

The invention also relates to the use of this composition for coating various substrates, such as paper, films, textiles and woven fabrics, glass, metal, etc., and the use as silicone sealing compounds.

In the examples described below, all stated parts and percentages are based on weight, unless stated otherwise. Furthermore, all viscosity data relate to a temperature of 25° C. Unless stated otherwise, the examples below were carried out at a pressure of the ambient atmosphere, i.e. about 1000 hPa, and at room temperature, i.e. at about 20° C., or at a temperature which is established on combining the reactants without additional heating or cooling.

The following abbreviations are used:

CS: pyrogenically prepared colloidal silica

EXAMPLES

Base Dispersions and Emulsions:

The silicone dispersion (I) is prepared by an acid-catalyzed polycondensation of methyltrimethoxysilane in aqueous liquor at 50° C., analogously to EP-A-335414, page 6, line 54, to page 7, line 5. The silicone dispersion (II) is prepared by a base-catalyzed polycondensation of methyltrimethoxysilane in aqueous liquor at 50° C., analogously to EP-A-335414, page 6, line 54, to page 7, line 5. The solids content of the dispersions described above is 8.5% by weight. The silicone oil emulsions (III and IV) are prepared by an acid-catalyzed polycondensation of dimethyldimethoxysilane or cocondensation of D4-cyclics with methyltrimethoxysilane in aqueous liquor at 95° C., analogously to EP-A-335414, page 6, line 54, to page 7, line 5.

The silicone oil emulsions (V and VI) are prepared by an acid-catalyzed polycondensation of dimethylpolysiloxane having α,ω-OH terminal groups (average chain length 35) with and without methyltrimethoxysilane, in emulsion, using dodecylbenzenesulfonic acid.

The silicone oil emulsions (VII and VIII) are prepared analogously to the emulsions (III) and (IV) under basic catalysis. The solids content of the products (III and VIII) is adjusted to 9% by weight. The silicone oil emulsion (IX) is prepared by a base-catalyzed cocondensation of D4-cyclics with aminopropyl-aminoethyltrimethoxysilane. The amino-silicone oil emulsions (X and XI) used in the examples are prepared according to the customary prior art, from the relevant silicone oils, emulsifier and water, etc.

Example 1

The abovementioned acidic silicone oil dispersions and emulsions are mixed at room temperature in the ratios described in the table, mixed with 0.1 part of Tonsil® Optimum FF (Süd-Chemie AG) (heterogenous catalyst), stirred, and reacted under the conditions specified in Table 1. The added heterogeneous catalyst is filtered off after the reaction. The solids content of the formulation obtained is adjusted to 30% by weight by distillation at 50° C. and 200 mbar.

All formulations described in Table 1 form resilient films on drying (RT/48 h or 150° C./10 min).

TABLE 1

Preparation of acidic formulations

| Example | Silicone dispersion (I) [parts] | Silicone dispersion/ emulsion | [Parts] | Reaction temperature [° C.] | Reaction time [min] |
|---|---|---|---|---|---|
| 1a | 1 | (III) | 99 | 50 | 60 |
| 1b | 5 | (III) | 95 | 50 | 60 |
| 1c | 10 | (III) | 90 | 50 | 60 |
| 1d | 20 | (III) | 80 | 50 | 60 |
| 1e | 30 | (III) | 70 | 50 | 60 |
| 1f | 40 | (III) | 60 | 50 | 60 |
| 1g | 5 | (III) | 95 | 60 | 30 |
| 1h | 5 | (IV) | 95 | 60 | 30 |
| 1i | 5 | (V) | 95 | 70 | 30 |
| 1j | 5 | (VI) | 95 | 80 | 30 |
| 1k [1)] | 5 | (III) | 95 | 50 | 60 |

[1)] 5% by weight of CS added

Comparative Example for Example 1b (Not According to the Invention)

The two components are mixed at room temperature in the ratio stated in Table 1, without the heterogeneous catalyst Tonsil® Optimum FF, and stirred for one hour at room temperature, and a film is then cast (as described above). At all film formation temperatures, the dried product obtained is a gel-like, tacky substance having absolutely no resilient properties.

Example 2

The abovementioned basic silicone oil dispersions and emulsions are mixed at room temperature in the ratios described in Table 2 and reacted under the conditions specified in Table 2. The solids content of the formulation obtained is adjusted to 30% by weight by distillation at 50° C. and 200 mbar.

All formulations described in Table 2 form resilient films on drying (RT/48 h or 150° C./10 min).

TABLE 2

Preparation of basic formulations

| Example | Silicone dispersion (II) [parts] | Silicone dispersion/ emulsion | [Parts] | Reaction temperature [° C.] | Reaction time [min] |
|---------|---------|---------|---------|---------|---------|
| 2a | 1 | (IX) | 99 | 65 | 60 |
| 2b | 5 | (IX) | 95 | 65 | 60 |
| 2c | 10 | (IX) | 90 | 65 | 60 |
| 2d | 20 | (Ix) | 80 | 65 | 60 |
| 2e | 30 | (IX) | 70 | 65 | 60 |
| 2f | 40 | (IX) | 60 | 65 | 60 |
| 2g | 5 | (VII) | 95 | 65 | 60 |
| 2h | 5 | (VIII) | 95 | 65 | 60 |
| 2i | 5 | (X) | 95 | 65 | 60 |
| 2j | 5 | (XI) | 95 | 65 | 60 |
| 2k [1)] | 5 | (IX) | 95 | 65 | 60 |

[1)] 5% by weight of CS added

Comparative Example for Example 2b (Not According to the Invention)

The two components are mixed at room temperature in the ratio stated in Table 2 and stirred for one hour at room temperature, and a film is then cast (as described above). At all film formation temperatures, the dried product obtained is a gel-like, tacky substance having absolutely no resilient properties.

Use Example 3

A formulation comprising 20 parts of silicone dispersion (I) and 80 parts of silicone oil emulsion (III) and having a solids content of 30% by weight was prepared analogously to Example 1 g. This formulation was applied to paper using a glass doctor blade and cured at 150° C. for 30 seconds in a drying oven. The extractables content was only 5% by weight. In comparison with the standard emulsions which are based on a platinum-catalyzed crosslinking reaction, the formulation described above has an unlimited pot life and cures better, which is evident from the low extractables content.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the preparation of an aqueous, 1-component composition which forms a resilient silicone network upon drying, comprising mixing together
   I) a surfactant-stabilized dispersion of a highly crosslinked silicone compound which carries reactive groups selected from silanol, hydrocarbonoxy, silanolate groups and mixtures thereof, and
   II) a surfactant-stabilized emulsion of optionally pre-crosslinked silicone oil which carries reactive groups selected from the group consisting of silanol, hydrocarbonoxy, silanolate groups, and mixtures thereof reacting I) and II) together at a temperature of at least 40° C. in the presence of a heterogenous catalyst and removing said heterogeneous catalyst to provide an aqueous 1-component composition free of metal catalyst.

2. The process of claim 1, in which the silicone dispersion (I) contains highly crosslinked silicone compound (Ia) comprising at least one of

| 30 to 100 mol % of | $R_{(1-a)}(R^1O)_a SiO_{3/2}$ | (Ia-1), |
| 20 to 100 mol % of | $(R^1O)_b SiO_{(4-b)/2}$ | (Ia-2), |
| and optionally | | |
| up to 70 mol % of | $R_{(2-c)}(R^1O)_c SiO_{2/2}$ | (Ia-3), and |
| up to 50 mol % of | $R_{(3)}SiO_{1/2}$ | (Ia-4), | wherein the sum of said mol percents total not more than 100 mol %,
in which
   R is identical or different and is a hydrogen atom or an Si—C-bonded $C_1$- to $C_{30}$-hydrocarbon radical optionally substituted by halogen atoms, and which optionally bears one or more functional groups,
   $R^1$ is identical or different and may be a hydrogen atom, an alkali metal or alkaline earth metal atom or a monovalent $C_1$- to $C_{16}$-hydrocarbon radical optionally substituted with halogen atoms, the carbon atoms of said $C_1$ to $C_{16}$ hydrocarbon radical optionally interrupted by one or more heteroatoms,
   a is 0 or 1,
   b is 0, 1, 2 or 3 and
   c is 0 or 1.

3. The process of claim 2, in which the silicone oil emulsion (II) contains silicone oils of the general formula

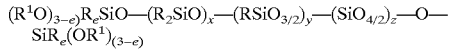

in which
   R is identical or different and is a hydrogen atom or an Si—C-bonded $C_1$- to $C_{30}$-hydrocarbon radical optionally substituted by halogen atoms, and which optionally bears one or more functional groups,
   $R^1$ is identical or different and may be a hydrogen atom, an alkali metal or alkaline earth metal atom or a monovalent $C_1$- to $C_{16}$-hydrocarbon radical optionally substituted with halogen atoms, the carbon atoms of said $C_1$ to $C_{16}$ hydrocarbon radical optionally interrupted by one or more heteroatoms,
   e is 0, 1 or 2,
   x is 2 to 1,000,000,
   y is 0 to 100,000 and
   z has the values 0 to 100,000 and
   y+z: x is not more than 1:10.

4. The process of claim 2, in which 100 parts of silicone dispersion (I) contain 1 to 50 parts of highly crosslinked silicone compound wherein said parts are parts by weight based on the total weight of silicone dispersion (I).

5. The process of claim 2, in which 100 parts of silicone oil emulsion (II) contain 1 to 60 parts of optionally pre-crosslinked silicone oils wherein said parts are parts by weight based on the total weight of the silicone oil emulsion (II).

6. The process of claim 1, in which the silicone oil emulsion (II) contains silicone oils of the general formula

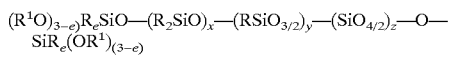

in which
   R is identical or different and is a hydrogen atom or an Si—C-bonded $C_1$- to $C_{30}$-hydrocarbon radical optionally substituted by halogen atoms, and which optionally bears one or more functional groups, $R^1$ is identical or different and may be a hydrogen atom, an alkali metal or alkaline earth metal atom or a monovalent $C_1$- to $C_{16}$-hydrocarbon radical optionally substituted with halogen atoms, the carbon atoms of said $C_1$ to $C_{16}$ hydrocarbon radical optionally interrupted by one or more heteroatoms, e is 0, 1 or 2, x is 2 to 1,000,000, y is 0 to 100,000 and z has the values 0 to 100,000 and y+z x is not more than 1:10.

7. The process of claim 6, in which 100 parts of silicone dispersion (I) contain 1 to 50 parts of highly crosslinked silicone compound wherein said parts are parts by weight based on the total weight of silicone dispersion (I).

8. The process of claim 6, in which 100 parts of silicone oil emulsion (II) contain 1 to 60 parts of optionally pre-crosslinked silicone oils wherein said parts are parts by weight based on the total weight of the silicone oil emulsion (II).

9. The process of claim 1, in which 100 parts of silicone dispersion (I) contain 1 to 50 parts of highly crosslinked silicone compound wherein said parts are parts by weight based on the total weight of silicone dispersion (I).

10. The process of claim 9, in which 100 parts of silicone oil emulsion (II) contain 1 to 60 parts of optionally pre-crosslinked silicone oils wherein said parts are parts by weight based on the total weight of the silicone oil emulsion (II).

11. The process of claim 1, in which 100 parts of silicone oil emulsion (II) contain 1 to 60 parts of optionally pre-crosslinked silicone oils wherein said parts are parts by weight based on the total weight of the silicone oil emulsion (II).

* * * * *